(12) United States Patent
Kressin et al.

(10) Patent No.: US 7,581,216 B2
(45) Date of Patent: Aug. 25, 2009

(54) PRESERVING PLATFORM INDEPENDENCE WITH NATIVE ACCELERATORS FOR PERFORMANCE CRITICAL PROGRAM OBJECTS

(75) Inventors: Mark S. Kressin, Lakeway, TX (US); Raymond Homback, Jr., Lexington, KY (US); James S. Johnston, Lexington, KY (US); William M. Quinn, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 11/040,902

(22) Filed: Jan. 21, 2005

(65) Prior Publication Data

US 2006/0168567 A1 Jul. 27, 2006

(51) Int. Cl.
*G06F 9/44* (2006.01)
*G06F 9/45* (2006.01)

(52) U.S. Cl. .................. 717/166; 717/148; 717/153; 717/159

(58) Field of Classification Search ............... 717/148, 717/166, 153
See application file for complete search history.

(56) References Cited

U.S. PATENT DOCUMENTS

| | | | | |
|---|---|---|---|---|
| 6,282,702 B1* | 8/2001 | Ungar | .................. | 717/148 |
| 6,289,506 B1* | 9/2001 | Kwong et al. | ............... | 717/148 |
| 6,295,643 B1* | 9/2001 | Brown et al. | ................ | 717/148 |
| 6,330,709 B1* | 12/2001 | Johnson et al. | ............. | 717/100 |
| 6,342,907 B1* | 1/2002 | Petty et al. | ................. | 715/762 |
| 6,453,460 B1* | 9/2002 | Keyes | ....................... | 717/108 |
| 6,530,080 B2* | 3/2003 | Fresko et al. | ............... | 717/166 |
| 6,634,022 B1* | 10/2003 | Leermakers | ............... | 717/158 |
| 6,654,954 B1* | 11/2003 | Hicks | ........................ | 717/162 |
| 6,675,230 B1* | 1/2004 | Lewallen | .................... | 719/328 |
| 6,675,375 B1* | 1/2004 | Czajkowski | ................. | 717/151 |
| 6,925,638 B1* | 8/2005 | Koved et al. | ................ | 717/155 |
| 7,065,743 B2* | 6/2006 | Blais et al. | .................. | 717/108 |
| 7,162,711 B2* | 1/2007 | Czajkowski et al. | ........ | 717/114 |
| 7,185,102 B1* | 2/2007 | Swaminathan et al. | ...... | 709/231 |

(Continued)

OTHER PUBLICATIONS

Dare Obasanjo, "A Comparison of Microsoft's C# Programming Language to SUN Microsystems' JAVA Programming Language",http://web.archive.org/web/20011217071122/http://www.25hoursaday.com/CsharpVsJava.html, Dec. 17, 2001, p. 1.*

(Continued)

*Primary Examiner*—Wei Y Zhen
*Assistant Examiner*—Chih-Ching Chow
(74) *Attorney, Agent, or Firm*—Stephen T. Keohane, Esq.; Steven M. Greenberg, Esq.; Carey Rodriguez Greenberg & Paul LLP

(57) ABSTRACT

A method, system and apparatus for preserving platform independence of a program while supporting native accelerators for performance critical program objects. In a method for preserving platform independence of a program while supporting native accelerators for performance critical program objects, the method can include identifying a reference to a program object in a platform independent computer program and determining if a platform specific implementation of the program object has been separately stored in addition to a platform independent implementation of the program object. If it can be determined that a platform specific implementation of the program object has been separately stored in addition to a platform independent implementation of the program object, the platform specific implementation of the program object can be loaded in lieu of the platform independent implementation.

1 Claim, 2 Drawing Sheets

U.S. PATENT DOCUMENTS

| | | | |
|---|---|---|---|
| 7,200,842 B1* | 4/2007 | Susser et al. | 717/159 |
| 7,213,240 B2* | 5/2007 | Wong et al. | 717/148 |
| 2003/0088860 A1* | 5/2003 | Wang | 717/153 |
| 2005/0063575 A1* | 3/2005 | Ma et al. | 382/128 |
| 2006/0080635 A1* | 4/2006 | Anwar et al. | 717/100 |

OTHER PUBLICATIONS

Lindholm et al, "The JAVA Virtual Machine Specification", Addison-Wesley Publishing Company, In., 1$^{st}$ Edition, 1997, Chapter 5, pp. 1-8.*

Czajkowski, "Application Isolation in JAVA Virtual Machine", ACM SIGPLAN Notices, vol. 35, pp. 354-366, 2000, "http://delivery.acm.org/10.1145/360000/353195/p354-czajkowski.pdf?key1=353195&key2=6924124021&coll=ACM&dl=ACM&CFID=18132670&CFTOKEN=54145541".*

Sun Java, "The Java HotSpotTM Performance Engine", May 10, 2000, archive.org/web/20000510225351/http://java.sun.com/products/hotspot/docs/general/hs2.html, pp. 1-7.*

* cited by examiner

PRESERVING PLATFORM INDEPENDENCE WITH NATIVE ACCELERATORS FOR PERFORMANCE CRITICAL PROGRAM OBJECTS

BACKGROUND OF THE INVENTION

1. Statement of the Technical Field

The present invention relates to the field of platform independent computing and more particularly to the management of platform independence for distributable objects in a platform independent computing application.

2. Description of the Related Art

Platform independent computing represents a modern advancement in computer science. The dawn of personal computing initially permitted only platform specific computing in which computer programs could be developed utilizing a particular computer programming language. To transform the generic source code of a computer program to object code required the use of a platform specific compiler and, for more complex programs, a platform specific linker. In particular, the platform specific compiler could be configured to translate the high level source code of the programming language to the specific machine instructions of a particular platform.

Several advantages are known to be associated with traditional, platform specific software development. Most notably, modern, platform specific compilers are known to be tightly coupled to hardware architecture of the underlying computing platform. Consequently, tremendous computing efficiencies can be recognized as the source code for a computer program can be tailored into very specific and highly efficient machine code for a target platform. Yet, platform specific software cannot be easily distributed across computing networks because in many circumstances, the ultimate host platform can differ from the target platform of the compiler which produced the platform specific code.

To address the desire to distribute computer programs to multiple, different host platforms without requiring the distribution of different versions of the same computing object, computer scientists developed platform independent computing technologies such as the Java, Erlang, Dylan and C# computing languages and associated development tools. Platform independent computing technologies allow software developers to develop a single set of source code for all target computing platforms. Compilers for platform independent computing languages typically produce intermediate byte code which can be interpreted at runtime in the target platform utilizing a virtual machine for a platform specific runtime environment.

A virtual machine within a runtime environment generally operates by loading required program objects when required through the operation of a class loader. In particular, class loaders provide the translation technology which can convert serialized byte code into named classes for execution in the virtual machine. Notably, class loaders can perform this conversion regardless of the storage means and location of the byte code. As a result, the virtual machine need not know the operational specifics associated with the file systems storing the byte code.

To address the desire to distribute computer programs to multiple, different host platforms without requiring the distribution of different versions of the same computing object, computer scientists developed platform independent computing technologies such as the JAVA™, ERLANG™, DYLAN™ and C#™ computing languages and associated development tools. Platform independent computing technologies allow software developers to develop a single set of source code for all target computing platforms. Compilers for platform independent computing languages typically produce intermediate byte code which can be interpreted at runtime in the target platform utilizing a virtual machine for a platform specific runtime environment.

Many assume that the performance problem of the platform independent paradigm has become insurmountable and have accepted the associated performance deficiencies. Yet others refuse to accept these deficiencies and, to address the operational deficiencies of such an environment, many developers resort to coding platform specific code for performance critical sections of a computer program. Yet, to do so can break the platform independence of the computer program.

SUMMARY OF THE INVENTION

The present invention addresses the deficiencies of the art in respect to platform independent computer programming and provides a novel and non-obvious method, system and apparatus for preserving platform independence with native accelerators for performance critical program objects. In this regard, a runtime environment which has been configured to preserve platform independence of a program while supporting native accelerators for performance critical program objects can include a virtual machine. The environment further can include a data store of platform independent program object implementations and a data store of platform specific program object implementations. Finally, the environment can include a class loader coupled to the virtual machine.

Importantly, the class loader can be programmed to selectively load platform specific program object implementations for performance critical program objects from the data store of platform specific program object implementations. Specifically, the class loader can load the platform specific program objects where such objects exist in addition to a platform independent implementation of the same program object. Otherwise the class loader can load platform independent program object implementations from the data store of platform independent program object implementations.

In a method for preserving platform independence of a program while supporting native accelerators for performance critical program objects, the method can include identifying a reference to a program object in a platform independent computer program and determining if a platform specific implementation of the program object has been separately stored in addition to a platform independent implementation of the program object. If it can be determined that a platform specific implementation of the program object has been separately stored in addition to a platform independent implementation of the program object, the platform specific implementation of the program object can be loaded in lieu of the platform independent implementation.

Notably, aside from the clear performance benefits of the present invention, the present invention also can provide significant development time and cost savings benefits. Specifically, through the use of the present invention, a software vendor can create a platform independent implementation of a program object and, only when required, need the vender provide a native implementation in order to enhance performance on key platforms. Thus, these native implementations can become a "drop in" and can be used only if found. Another advantage of this "drop in" native implementation approach is that it can be easy for a software vendor to pass the burden of the development of native implementations of performance critical program objects to other venders.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for preserving platform independence with native accelerators for performance critical program objects. In accordance with the present invention, a virtual machine can be configured with a custom class loader programmed to selectively load program objects based upon whether the named program object is deemed performance critical. For a program object deemed to be performance critical in nature, the class loader first can attempt to load a platform specific, "native" implementation of the program object. If a platform specific implementation of the program object cannot be located or loaded, a platform independent, "generic" implementation of the program object can be loaded instead.

In this way, the platform independence of the computer program can be preserved, while platform specific implementation of critical program objects can be utilized to avoid the performance deficiencies of the conventional virtual machine. In this regard, a purely platform independent architecture always can be presumed excepting for when a performance critical object is to be loaded. Even then, however, a platform independent program object can be loaded unless a native accelerated implementation can be located. Consequently, at any time a native accelerated implementation for a performance critical program object can be provided without breaking the platform independent nature of the computer program.

Figure 1:
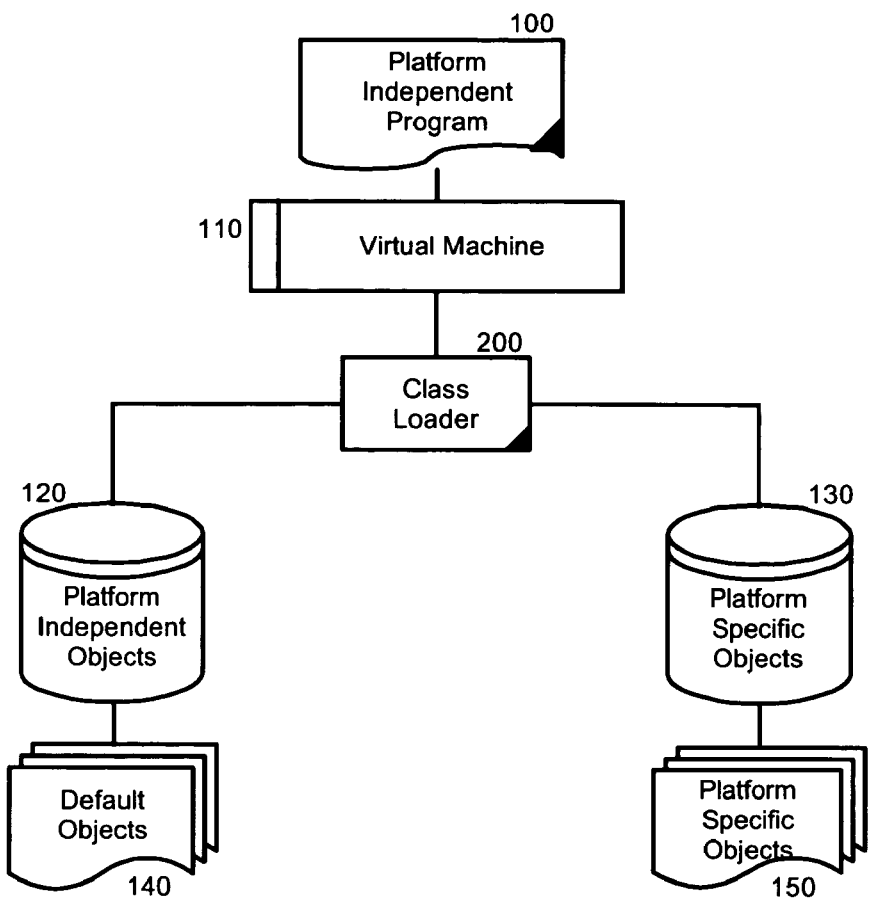
FIG. 1 is a schematic illustration of a virtual machine configured to preserve platform independence with native accelerators for performance critical program objects; and, FIG. 2 is a flow chart illustrating a process for preserving platform independence with native accelerators for performance critical program objects.

In further illustration, FIG. 1 is a schematic illustration of a virtual machine configured to preserve platform independence with native accelerators for performance critical program objects. The virtual machine 110 can include a class loader 200 programmed to load designated program objects, for instance according to the name of the program object. Unlike conventional class loaders, however, the class loader 200 of the present invention can attempt to load designated program objects referenced within a platform independent program 100 by first seeking a native, accelerated, platform specific form of the objects 150 in a data store of platform specific objects 130. To the extent that a platform specific form of a reference program object cannot be located in the data store of platform specific objects 130, a default, platform independent form of the objects 140 can be loaded from a data store of platform independent objects 120.

Figure 2:
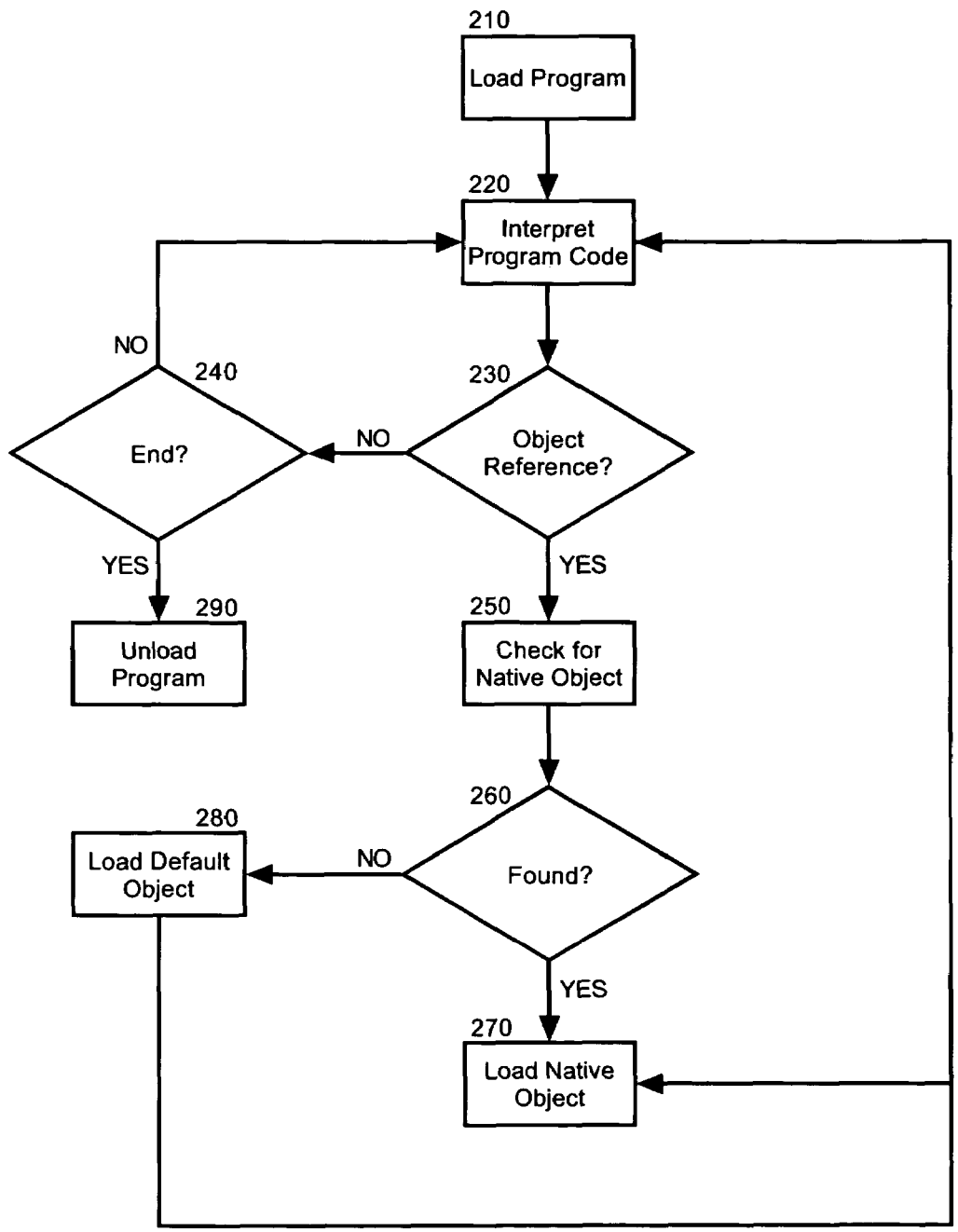

In more particular illustration, FIG. 2 is a flow chart illustrating a process for preserving platform independence with native accelerators for performance critical program objects. Beginning in block 210, a platform independent computer program can be loaded which can reference one or more program objects such as Java classes and the like. In block 220, the loaded program can be interpreted and program object references can be identified and processed until the program ends in decision block 240 leading to block 290.

Whenever an object reference is identified in decision block 230, in block 250 a data store of native, accelerated, platform specific object implementations can searched to determine if a native, accelerated, platform specific implementation for the referenced object can be located. If in decision block 260 a native, accelerated, platform specific implementation for the referenced object can be located, in block 270 the located program object can be loaded. Otherwise, in block 280, a default, platform independent implementation of the referenced program object can be loaded.

In more particular illustration, FIG. 2 is a flow chart illustrating a process for preserving platform independence with native accelerators for performance critical program objects. Beginning in block 210, a platform independent computer program can be loaded which can reference one or more program objects such as JAVA classes and the like. In block 220, the loaded program can be interpreted and program object references can be identified and processed until the program ends in decision block 240 leading to block 290.

In an alternative and preferred aspect of the invention, a class loader which differs from a standard class loader need not be provided. Rather, in the alternative aspect of the invention, both a native implementation and a default implementation of a program object can be provided and logic within the default program object can be provided to specify to the default class loader which implementation to utilize at real-time. In this way, providing a custom class loader to include the foregoing logic as described in FIG. 2 will not be required. Rather, the logic can be provided within a program object.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for preserving platform independence of a program while supporting a platform specific implementation of program objects for performance critical program code objects when loading a class during execution of the program, the method comprising the steps of:

identifying in a virtual machine a reference to a program object in a platform independent computer program;

determining in the virtual machine by a class loader if a platform specific implementation of the same platform independent computer program of said program object has been separately stored in addition to a platform independent implementation of said program object; and, if it is determined in the virtual machine that a platform specific implementation of said program object has been separately stored in addition to a platform independent implementation of said program object, loading said platform specific implementation of said program object in lieu of said platform independent implementation during realtime.

* * * * *

UNITED STATES PATENT AND TRADEMARK OFFICE
CERTIFICATE OF CORRECTION

PATENT NO. : 7,581,216 B2
APPLICATION NO. : 11/040902
DATED : August 25, 2009
INVENTOR(S) : Kressin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 977 days.

Signed and Sealed this

Fourteenth Day of September, 2010

David J. Kappos
*Director of the United States Patent and Trademark Office*